United States Patent
Beigang et al.

(10) Patent No.: US 11,320,004 B2
(45) Date of Patent: May 3, 2022

(54) OVERRUNNING CLUTCH HAVING A FRICTION-INDUCED ACTUATING FORCE

(71) Applicant: GKN Automotive Ltd., Birmingham (GB)

(72) Inventors: Wolfgang Beigang, Neunkirchen-Seelschied (DE); Thomas Weckerling, Sankt Augustin (DE); Maximilian Werkhausen, Cologne (DE); Jan Haupt, Kürten (DE); Dirk Güth, Detmold (DE)

(73) Assignee: GKN Automotive Ltd., Birmingham (GB)

(*) Notice: Subject to any disclaimer, the term of this patent is extended or adjusted under 35 U.S.C. 154(b) by 65 days.

(21) Appl. No.: 16/645,162

(22) PCT Filed: Sep. 12, 2017

(86) PCT No.: PCT/EP2017/072882
§ 371 (c)(1),
(2) Date: Mar. 6, 2020

(87) PCT Pub. No.: WO2019/052636
PCT Pub. Date: Mar. 21, 2019

(65) Prior Publication Data
US 2020/0362925 A1 Nov. 19, 2020

(51) Int. Cl.
*F16H 1/46* (2006.01)
*B60K 17/16* (2006.01)
(Continued)

(52) U.S. Cl.
CPC .......... *F16D 41/14* (2013.01); *F16D 41/125* (2013.01); *F16D 11/00* (2013.01); *F16D 11/06* (2013.01);
(Continued)

(58) Field of Classification Search
None
See application file for complete search history.

(56) References Cited

U.S. PATENT DOCUMENTS 1,396,343 A * 11/1921 Richardson ............. F16D 41/12
192/46
1,883,966 A * 10/1932 Krause .................... F16D 41/12
74/576
(Continued)

FOREIGN PATENT DOCUMENTS

CN 1320774 A 11/2001
CN 2602214 Y 2/2004
(Continued)

OTHER PUBLICATIONS

International Search Report and Written Opinion for PCT/EP2017/072882 dated Jun. 13, 2018 (10 pages; with English translation).
(Continued)

*Primary Examiner* — Charles A Fox
*Assistant Examiner* — Farhana Pervin
(74) *Attorney, Agent, or Firm* — Bejin Bieneman PLC

(57) ABSTRACT

The disclosure relates to an overrunning clutch, comprising a torque-introducing clutch element, a torque-receiving clutch element and switching element, which is forced from an engagement position into a freewheeling position or from a freewheeling position into an engagement position in dependence on the direction of a sufficient change in the rotational angle position between the torque-introducing clutch element and the torque-receiving clutch element by means of an actuating force applied to the switching element by an actuator. According to the disclosure, the actuating force is a friction-induced actuating force, which is induced by means of a friction-force pairing between the actuator and a component of the overrunning clutch that is in frictional contact with the actuator and the actuator forms an (Continued)

interlockingly acting actuating stop, by means of which the actuating force acts on the switching element.

19 Claims, 4 Drawing Sheets

(51) Int. Cl.
*F16D 41/14* (2006.01)
*F16D 41/12* (2006.01)
F16D 41/064 (2006.01)
F16D 41/069 (2006.01)
F16D 43/204 (2006.01)
F16D 43/20 (2006.01)
F16D 43/208 (2006.01)
F16D 43/202 (2006.01)
F16D 11/06 (2006.01)
F16D 11/12 (2006.01)
F16D 11/00 (2006.01)
F16D 41/08 (2006.01)

(52) U.S. Cl.
CPC ............ *F16D 11/12* (2013.01); *F16D 41/064* (2013.01); *F16D 41/069* (2013.01); *F16D 41/084* (2013.01); *F16D 41/086* (2013.01); *F16D 41/12* (2013.01); *F16D 43/20* (2013.01); *F16D 43/202* (2013.01); *F16D 43/204* (2013.01); *F16D 43/208* (2013.01)

(56) References Cited

U.S. PATENT DOCUMENTS

| | | | | |
|---|---|---|---|---|
| 2,323,353 | A * | 7/1943 | Plog | F16D 41/12 |
| | | | | 192/46 |
| 2,574,004 | A | 11/1951 | Zingsheim | |
| 4,126,214 | A * | 11/1978 | Kiss | F16D 41/14 |
| | | | | 192/36 |
| 4,771,872 | A | 9/1988 | Kampf | |
| 5,692,590 | A | 12/1997 | Iihara | |
| 6,155,394 | A | 12/2000 | Shook | |
| 6,193,038 | B1 | 2/2001 | Scott | |
| 7,980,372 | B2 * | 7/2011 | Wiesneth | F16D 41/12 |
| | | | | 192/46 |
| 8,056,690 | B2 | 11/2011 | Samie | |
| 8,210,331 | B2 | 7/2012 | Keshtkar | |
| 8,286,772 | B2 | 10/2012 | Eisengruber | |
| 9,109,636 | B2 | 8/2015 | Kimes | |
| 2006/0260896 | A1 * | 11/2006 | Jung | F16D 41/067 |
| | | | | 192/46 |
| 2008/0185253 | A1 | 8/2008 | Kimes | |
| 2012/0228076 | A1 | 9/2012 | Tate, Jr. | |
| 2014/0374212 | A1 | 12/2014 | Tamura | |
| 2017/0023073 | A1 | 1/2017 | Rivera | |
| 2017/0254371 | A1 | 9/2017 | Peglowski | |

FOREIGN PATENT DOCUMENTS

| | | |
|---|---|---|
| CN | 101990608 A | 3/2011 |
| CN | 202833742 U | 3/2013 |
| CN | 104019154 A | 9/2014 |
| CN | 105473885 A | 4/2016 |
| CN | 106641011 A | 5/2017 |
| DE | 632395 C | 7/1936 |
| DE | 763479 C | 1/1952 |
| DE | 2354332 A1 | 5/1974 |
| DE | 11 2015 001203 T5 | 12/2016 |
| DE | 10 2017 104 053 A1 | 9/2017 |
| EP | 1148264 A1 | 10/2001 |
| GB | 2034420 B | 10/1982 |
| JP | S56-90127 A | 7/1981 |
| JP | H08326784 A | 12/1996 |
| JP | H09-210101 A | 8/1997 |
| JP | 2006250352 A | 9/2006 |
| WO | 2018099542 A1 | 6/2018 |

OTHER PUBLICATIONS

International Search Report and Written Opinion for PCT/EP2017/072876 dated Jun. 13, 2018 (10 pages; with English translation).
JPO Office Action for Application No. JP2020-514904 dated Mar. 19, 2021 (5 pages; with English translation).
Chinese Office Action for Application No. CN201780094828.X dated Jan. 12, 2021 (14 pages; with English machine translation).
Chinese Office Action for Application No. CN201780094832.6 dated Jan. 4, 2021 (10 Pages; with English machine translation).
Non-Final Office Action dated Apr. 28, 2021 for U.S. Appl. No. 16/645,645 (36 pages).

* cited by examiner

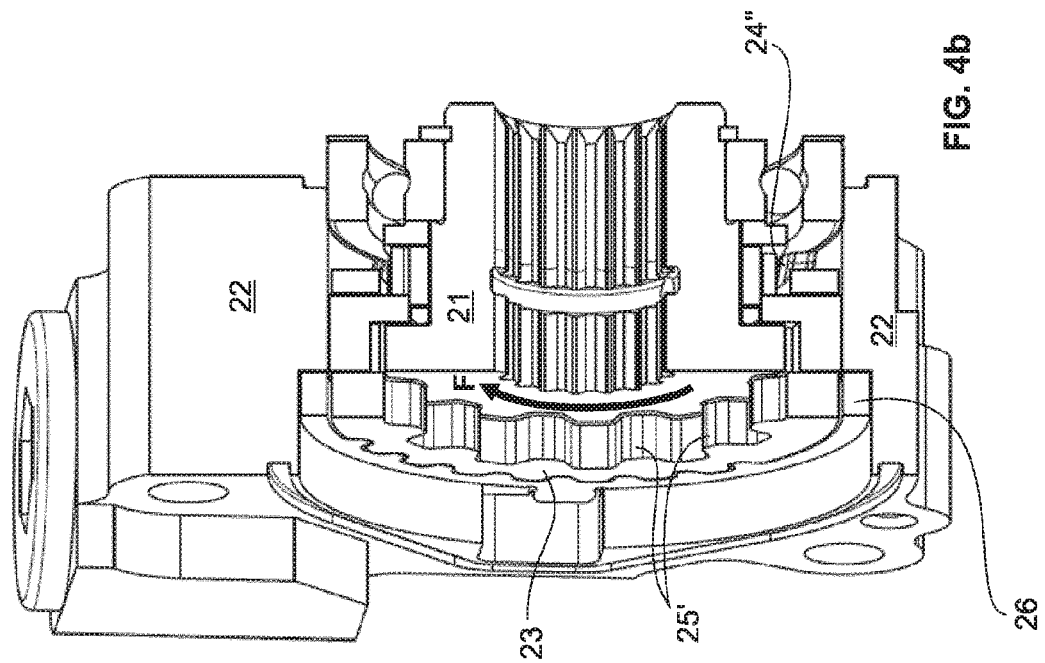
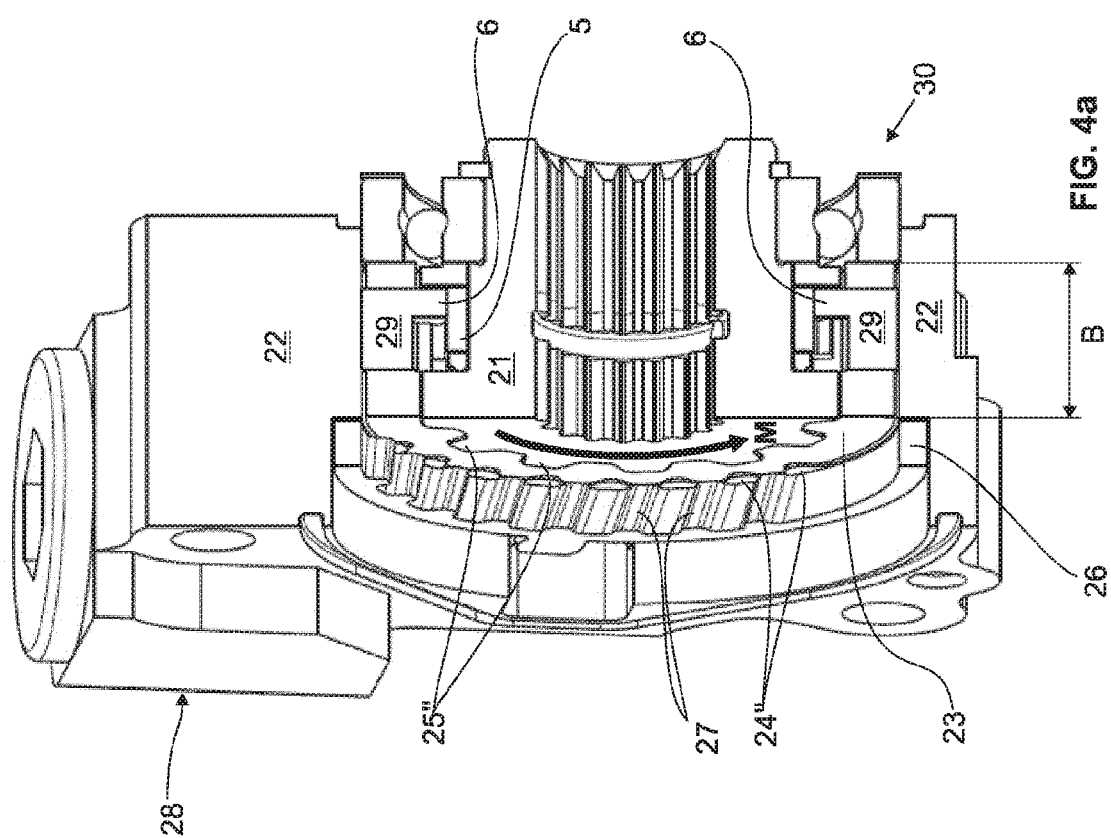

OVERRUNNING CLUTCH HAVING A FRICTION-INDUCED ACTUATING FORCE

CROSS-REFERENCE TO RELATED APPLICATIONS

This application is a national stage of, and claims priority to, Patent Cooperation Treaty Application No. PCT/EP2017/072882, filed on Sep. 12, 2017, which application is hereby incorporated herein by reference in its entirety.

BACKGROUND

The disclosure relates to a self-switching overrunning clutch which is specified for the use in a drivetrain of a motor vehicle, in particular in a passenger motor vehicle.

Overrunning clutches which enable a free mutual relative rotation of two clutch members in an overrun rotation direction and which under rotational stress (load rotation direction) counter to the overrun rotation direction establish a rotationally fixed connection between the two clutch members are known to the person skilled in the art. Overrunning clutches can be used as freewheeling clutches or as reverse rotation locks.

Overrunning clutches are most often used conjointly with spring-loaded ratchets which are pivotably mounted on one of the two clutch members or on an intermediate member disposed between the two clutch members and which, as a function of the direction of a relative mutual rotation of the clutch members, under rotational stress (in the load rotation direction) counter to the overrun direction for establishing a rotationally fixed connection come to bear in the load-supporting manner with detents, or by contrast under stress of the overrunning clutch in the overrun rotation direction sweep across the detents without blocking a mutual relative rotation of the clutch members.

An alternative design of overrunning clutches provides between the clutch members an intermediate member which interacts with the clutch members and which, under rotational stress of the clutch (load rotation direction) counter to the overrun direction, assumes a load-transmitting position in which said intermediate member by way of engagement pairings engages with both clutch members. A drive torque or support torque is transmitted from one clutch member to the intermediate member, and from the intermediate member to the other clutch member. In order for overrunning to be guaranteed, the intermediate member by way of a control mechanism is transferred from the load-transmitting position to a position which guarantees the overrunning and in which the load-supporting engagement between the intermediate member and at least one of the two clutch members is cancelled. The control mechanism of clutches of this type has control latches which, as opposed to load-supporting ratchets, do not have any noteworthy load-transmitting function but only a controlling and synchronizing function for initiating the transfer of the intermediate member from the overrun position to the engagement position. Overrunning clutches of this type are disclosed in DE 763 479 or DE 2 354 332.

One aspect to be taken into account in the design embodiment of overrunning clutches is the question of controlling the switching member positions. The switching members, independently of the construction mode of the overrunning clutch, have to guarantee that a free mutual rotation of the clutch members is possible in the overrun rotation direction, while the switching members in the load rotation direction have to permanently assume a load-supporting position (locking members) or at least temporarily assume a position that supports a control impulse (control members) so as to either be able to transmit the load torque by means of the switching member (locking-member construction mode) or so as to be able to initiate the repositioning of the intermediate member (control-member construction mode). The load-supporting position of the locking members and the position of the control members that supports a control impulse hereunder is comprehensively referred to as the engagement position.

It is most commonplace for the switching members to be embodied as pivotably mounted latches and to set said switching members in a permanently spring-loaded manner in relation to detents, in particular in a radial manner in relation to a detent collar which extends across a circumference and has a multiplicity of individual detents, and to align said switching members in such a manner that the latches sweep across the detents in the overrun rotation direction, but in the event of a change to the load rotation direction interact in a supporting manner with the detents. This embodiment is considered disadvantageous because the sweeping action of the latches across the detents in a clutch stressed in the overrun direction, said latches being permanently set in relation to said detents, generates a noise which is typical of many overrunning clutches and becomes increasingly louder in the case of increasingly larger clutches of more stable design, and can be unacceptably disturbing in many applications.

In the case of overrunning clutches that operate with ratchets, there is additionally the issue that the torque to be transmitted in the load direction has to be supported by way of the ratchets. The ratchets, as components which are to be designed in a relatively delicate manner and are to be pivotably mounted in a spring-loaded manner within the clutch by way of even more delicate components, have an only minor potential in terms of torque transmission. This applies even more when the effective diameters on which the ratchet acts on the clutch members are small and a torque to be transmitted has to be supported by way of a small lever arm.

An overrunning clutch according to the locking-member construction mode in which a ratchet which is not spring-loaded is positionally mounted so as to be pivoted by way of a pivot axle pin on a latch collar which is rotatable to a limited extent relative to the two clutch members, wherein the ratchet loosely engages with the torque-introducing internal clutch member and, depending on the rotation direction of the torque-introducing internal clutch member, as a result of rotating said internal clutch member in relation to the latch collar which is received within the multiple-part torque-receiving external clutch member, assumes a load-supporting position or a position that guarantees overrunning, is known from publication U.S. Pat. No. 8,210,331 B2. This construction does indeed avoid that the ratchets have to be set in a spring-loaded manner in relation to entrainment detents and therefore also avoids a generation of noise that would otherwise be associated therewith. However, the torque is to be transmitted by way of the delicate ratchets such that a sufficient potential in terms of torque transmission cannot be achieved in the case of a compactness that is to be targeted for the use in a motor vehicle drivetrain. Moreover, the construction of the overrunning clutch is complex and not very compact. The latch collar, when the clutch is being stressed in the overrun rotation direction, is entrained by the torque-introducing clutch member by way of the ratchets such that, in the event of non-uniform running of the internal driving clutch member, there is the risk of the latch collar for reasons of inertia bouncing back and forth in relation to the internal clutch member and of the ratchets having to continually absorb shocks.

A ratchet overrunning clutch in which a ratchet by means of pivot axle pins is positionally mounted in a pivotable manner on two friction disks that are disposed between two clutch members is known from publication U.S. Pat. No. 1,396,343. Depending on the rotation direction of the clutch, an interaction of clutch members, friction disks, and the ratchet leads to the ratchets by a clutch member being urged to a load-supporting position or into a position that guarantees the overrunning. In the event of the ratchet being situated in the overrun position, the friction disks rotate relative to a clutch member at a differential rotating speed which is established between the clutch members. The friction disks cause high frictional losses in the overrun rotation direction, and the construction bears the risk that the friction disks seize between the clutch members, in particular in the event of high thermal stress as a result of high differential rotating speeds between the clutch members and/or in the case of the ingress of foreign objects, dirt, or abrasion dust between the friction disk and the respective neighboring component. Moreover, the ratchets for reasons of centrifugal force urge outward by way of a great force in the event of an overrunning clutch stressed in the overrun rotation direction, this in specific load-change situations leading to heavy and therefore unacceptably loud impacting of the ratchets against detent faces provided on the external clutch member. There is additionally the issue that an actuating force causing the repositioning of the ratchets is exerted on the ratchets by the clutch members per se, and the frictional forces between the clutch members and the ratchets that result on account of said clutch members and the ratchets being in contact can counteract as an impediment the ratchet adjustment targeted in the event of a change of a load state.

An overrunning clutch in which a ratchet is pivotably mounted on a clutch member of the overrunning clutch and by way of friction levers is in frictional contact with friction rings which are disposed on the other clutch member and rotate conjointly with the latter is known from DE 632 395. On account of the friction levers which are in frictional contact with the friction rings and which act as a lever arm, an actuating torque is exerted on the ratchet when a differential rotating speed is present between the clutch members, the ratchet on account of said actuating torque being urged from a position that guarantees overrunning to a load-supporting position, or vice versa. This construction has the disadvantage that the friction rings and the friction levers are permanently in frictional contact when a differential rotating speed is present, so that it is to be anticipated that effects of wear will arise in the course of time on account of which the latch control can be compromised, on the one hand. On the other hand, in the design embodiment shown in DE 632 395 it is necessary for the friction levers to laterally engage across the latch detents which requires additional axial construction space and the provision of friction faces on the clutch members that lie axially outside the latch detents, so that the integration of an overrunning clutch of this type in a compact functional group may be impeded.

The overrunning clutches described above are suitable only to a limited extent for applications in the construction of motor vehicles, in particular for applications in part of a drivetrain, which applications on account of the provision of the reduction stages require a high potential in terms of torque transmission and in which moreover a particularly compact overrunning clutch which can be integrated in a space-saving manner in the surrounding drivetrain architecture, which is easy to manufacture and not highly prone to defects, which switches rapidly and by way of minor masses to be moved and small mechanical switching impulses and is to make available silent overrunning is desirable.

SUMMARY

The disclosure relates to clutches which operate by way of load-transmitting locking members, in particular ratchets, as well as to those in which control members, in particular control latches which simply initiate the activation of an ultimately load-transmitting intermediate member are used. The disclosure furthermore comprises overrunning clutches which are used as freewheeling clutches as well as such which are used as a reverse rotation lock. To the extent that an explicit differentiation is not required, the term switching member is comprehensively used hereunder for the load-transmitting locking member as well as for the control member which acts in a largely load-free manner.

The disclosure is directed to making available a particularly suitable self-switching overrunning clutch which is not highly prone to defects for the use in a drivetrain of a motor vehicle, in particular in an example electromotive driven axle drive unit having a switchable two-speed planetary gearbox, said overrunning clutch being capable of transmitting a high torque, being of compact construction, easy to manufacture, and also operating largely silently in the overrun rotation direction. The masses to be moved in a switching procedure herein are to be kept small. The disclosure can achieve a switching member activation by way of which the mentioned objectives can be implemented in an effective and advantageous manner.

The disclosure provides an overrunning clutch having a torque-introducing clutch member, a torque-receiving clutch member, and having a switching member which, as a function of the direction of an adequate change in the rotation-angle position prevalent between the torque-introducing clutch member and the torque-receiving clutch member, by means of an actuating force exerted on the switching member by an actuator is urged from an engagement position to an overrun position so as to indirectly or directly establish free mutual rotation of the clutch members in an overrun rotation direction, or from an overrun position is urged to an engagement position so as to indirectly or directly establish a rotationally fixed coupling of the clutch members.

It is provided herein that the actuating force is a friction-force-induced actuating force which is induced by a friction-force pairing between the actuator and a component of the overrunning clutch that is in frictional contact with said actuator, and the actuator configures an actuation detent which acts in a form-fitting manner and by way of which the actuating force acts indirectly or directly on the switching member.

The actuating force being a friction-force-induced actuating force which is induced by a friction-force pairing between the actuator and a component of the overrunning clutch that is in frictional contact with said actuator means in particular that the friction force which in the relevant operating states is created between the actuator and the component with which said actuator is in frictional contact is causal in terms of the force which is imparted to the actuator and which said actuator by way of the actuation detent is capable of transmitting as an actuating force indirectly or directly to the switching member. The actuating force being friction-force-induced furthermore requires that the actuator is a component which is separate from the component with which said actuator forms a friction pairing, and that a differential rotating speed can be established between the actuator and the component with which the actuator forms a friction pairing, and that the actuator and said component are capable of being rotatably moved relative to one another.

The actuator having an actuation detent means that the actuator for transmitting the actuating force, in particular by way of an actuation edge, comes to bear in a form-fitting manner directly or indirectly on the switching member, so as to exert an actuating torque on the switching member. Directly in this context means that the control detent acts directly on the switching member; indirectly in this context means that intermediate elements may be provided between the switching member and the actuation detent, the actuating force being transmitted from the actuator by way of said intermediate elements to the actual switching member. The actuation detent is for example configured as an actuation detent with double-sided action, so that actuating forces can be exerted on the switching member in two opposite effective directions.

The switching member is for example positionally mounted on a component of the overrunning clutch that is separate from the actuator. This means that the correct positioning and supporting of the switching member within the overrunning clutch in order for the clutch to function is not guaranteed by the actuator, but that the actuator exerts on the switching member only an actuating force for transmitting the switching member from the overrun position to the engagement position (or vice versa), said actuating force acting tangentially in the circumferential rotation direction. The holding of the switching element within the overrunning clutch in a positionally true manner, in particular mounting of the switching member which is effective in a radially inward and a radially outward manner, however does not have to be guaranteed solely by way of the actuator. To this end, a component that is separate from the actuator can be resorted to, for example a clutch member and/or an intermediate member (the latter in the case of the control-member construction mode) on which the actuator is positionally mounted. It is in particular not required that the switching member is pivotably mounted on the actuator impinged by the friction force. The switching member, or an intermediate element interacting therewith, can plunge only loosely into the actuator, for example in the radial direction, and be in contact with the actuator only by way of actuation edges acting in the circumferential direction, so as to exert an actuating torque on the switching member and to pivot the latter about the pivot axis thereof. This enables a significantly simplified and in particular compact construction of the actuator, since a pivot axle mounting which sets the switching member and the actuator in permanent mutual engagement can be dispensed with, and because the actuator can be disposed radially outside or radially within a pivot axis of the switching member about which said actuator when pivoting from the overrun position to the engagement position (or vice versa) pivots.

A switching member in the overrunning clutch being capable of establishing indirectly or directly the free mutual rotatability of the clutch members, or a rotationally fixed coupling between the clutch members, means either that the switching member is a load-transmitting locking member and the rotationally fixed coupling (locking member in the engagement position) or the free rotatability (locking member in the overrun position) is established directly by the switching member position per se (the load-transmitting switching member per se, as a locking member, alternates between the engagement position and the overrun position), or that the switching member is only a control member and the rotationally fixed coupling, or the free mutual rotatability, respectively, of the clutch members is established indirectly in that the switching member only initiates the transfer of an intermediate member from a load-transmitting position to an overrun-permitting position (or vice versa).

The afore-described design embodiment of an overrunning clutch in comparison to overrunning clutches known from the prior art enables the implementation of a host of advantages.

In the explanations above and hereunder it is to be taken into account that there are manifold possibilities in terms of assigning the functions of an overrunning clutch to the individual clutch members, in particular that the overrunning clutch can be used as a freewheeling clutch or as a reverse rotation lock, and that the torque-introducing first clutch member may be an internal clutch member and the torque-receiving clutch member may be an external clutch member, or the torque-introducing clutch member may be an external clutch member and the torque-receiving clutch member may be an internal clutch member.

The torque-introducing clutch member herein is the driving clutch member by way of which a torque is introduced into the clutch when the clutch is being impinged in the load rotation direction. The torque-receiving clutch member is the driven or supporting clutch member which receives a torque when the clutch is being impinged in the load rotation direction, and is driven by the torque-introducing clutch member at the same rotating speed (overrunning clutch), or in the case of a reverse rotation lock blocks a rotation of the torque-introducing clutch member in relation to a locationally fixed housing, for example.

One advantageous design embodiment results when the actuator, conjointly with the torque-introducing clutch member and/or a component that is rotationally fixed to the latter, forms a friction pairing, and the switching member is positionally mounted on the torque-receiving clutch member, a component that is rotationally fixed to the latter, and/or on an intermediate member that engages with the torque-receiving clutch member. This design embodiment leads to the switching member, when the clutch is being stressed in the overrun rotation direction, rotating about the rotation axis at the same rotating speed at which the torque-receiving clutch member rotates about the rotation axis. If the torque-receiving clutch member is part of an overrunning clutch that functions as a reverse rotation lock, the switching member stops conjointly with the torque-receiving clutch member, while the torque-introducing clutch member rotates in relation to the actuator and the switching member, on account of the actuating force acting thereon, in a friction-force-induced and permanent manner is urged to the overrun position such that impacting of the switching member against detents is avoided.

In order to ensure that an adequate friction force is induced on account of the friction-force pairing, on the one hand, and said friction force, on the other hand, does not exceed the required amount in order for loss output to be avoided as far as possible, it can be provided that one or a plurality of pre-tensioning elements, for example pre-tensioning springs, are provided on the actuator, the friction force being able to be influenced in a targeted manner by the selection of said pre-tensioning elements. The actuator can be embodied in multiple parts, and the pre-tensioning elements can act between individual parts of the actuator, or the actuator can be integrally configured and the pre-tensioning elements can be an integral component part of the actuator, in particular be configured so as to be materially integral with the latter. In the context with the consideration that the actuator does not have to guarantee any positional mounting of the switching member (in particular no pivot axle mounting), the last-mentioned design embodiment enables in particular an actuator construction in which an actuator of very flat construction can be used.

The actuator furthermore, for example, is in frictional contact exclusively with one clutch member and/or a component that is rotationally fixed to said clutch member, but not also with the respective other clutch member or a component that is rotationally fixed thereto, such that only friction-force pairings which are relevant between the actuator, on the one hand, and components which are connected in the rotationally-fixed manner to one another, on the other hand, are causal in terms of the friction force relevant to the actuating force. This avoids that a plurality of components which in operation rotate in a dissimilar manner act on the actuator, the friction forces of said components impeding one another and thus potentially impeding the friction-force-induced adjustment of the switching member.

The actuator is preferably embodied as an actuator ring and is disposed on the internal side, or the external side, respectively, so as to neighbor an internal or external, respectively, radial face of a clutch member or of a component that is rotationally fixed thereto. The actuator can in particular encompass externally an outwardly facing radial face. It can however also be provided that the actuator is tightly fitted in the external clutch member on the internal side of a radially inward facing radial face.

The generation of friction force between the actuator and the component of the overrunning clutch that neighbors the actuator can take place by way of pairings of mutually neighboring axial faces and/or by way of pairings of mutually neighboring radial faces. However, it is for example provided that the friction-force pairing that induces the actuating force is implemented by way of pairings of axial faces, and the friction force is introduced into the actuator by way of axial faces provided on the actuator. To this end, the actuator can configure axial friction faces which by way of the pre-tensioning elements are set in a defined manner against neighboring axial faces. This design embodiment in which pre-tensioning elements that act in the axial direction are used, has in particular also the advantage that potential centrifugal forces do not have any direct influence on the friction force, and thus cannot influence the actuating force to a notable extent. The friction force is largely independent of the rotating speed.

The external clutch member, while forming an annular space situated between the external and the internal clutch member, for example engages across the internal clutch member, wherein the actuator at least in part is for example disposed within said annular space. It can furthermore be provided that the actuator is at least partially, for example completely, disposed radially on the inside on the engagement width which is provided on the external clutch member and is torque-transmitting when the clutch is being stressed in the load rotation direction. The engagement width provided on the external clutch member is the effective width of the engagement that guarantees the torque transmission from the external clutch member or to the external clutch member, said engagement being either between a locking member or an intermediate member that is activated by way of a control member, on the one hand, and the external clutch member, on the other hand.

For configuring the actuation detent on the actuator, two actuation edges which act in opposite directions and which for introducing the actuating force indirectly or directly onto the switching member come to bear in a form-fitting manner on the switching member, or on an intermediate element that interacts with the switching member, are for example configured on the actuator, said intermediate element being for instance an actuation lever which relays the actuating force onto the switching member. To this end, the switching member or the intermediate element loosely engages between the actuation edges provided on the actuator, or engages across said actuation edges on both sides. The actuation detent can be formed by at least one elevation provided on the actuator, for example by two mutually opposite elevations, or by mutually opposite edges of a depression or clearance incorporated in the actuator. The elevation(s), or the edges of the depression or clearance, in this instance form the actuation edges.

The actuator can have a multiplicity of actuation detents. The actuator for example has a number of actuation detents that corresponds to the number of switching members. If a plurality of switching members is provided, it can in particular be provided that the actuator moves in a synchronized manner the plurality of switching members by way of the respective actuation detents.

BRIEF DESCRIPTION OF THE DRAWINGS

FIG. 4a shows a lockable overrunning clutch which is used as a reverse rotation lock, having a clutch housing which functions as the torque-receiving clutch member, and having an intermediate member which is situated in the load-transmitting position;

FIG. 4b shows the overrunning clutch from FIG. 4a having the intermediate member situated in the overrun-permitting position;

FIG. 7a shows a control member in the form of a friction ring used in the overrunning clutches according to one of preceding FIGS. 4a to 6a;

DETAILED DESCRIPTION

Figure 1A:
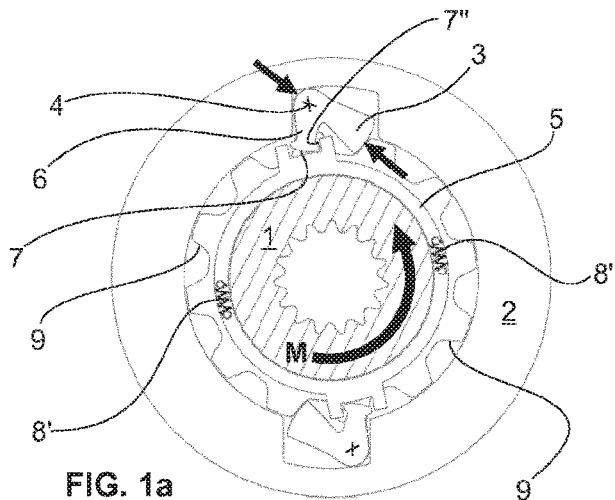
FIG. 1a shows a schematic diagram of an overrunning clutch which is configured as a freewheeling clutch and is impinged in the load rotation direction, the torque-introducing clutch member in said overrunning clutch being the internal clutch member and the torque-receiving clutch member being the external clutch member.

FIGS. 1a/1b, 2a/2b, 3a/3b, and 4a to 6b to some extent in a highly simplified illustration show a few exemplary embodiments of an overrunning clutch, impinged in each case in the load rotation direction (figures a) and in the overrun rotation direction (figures b).

Figure 1B:
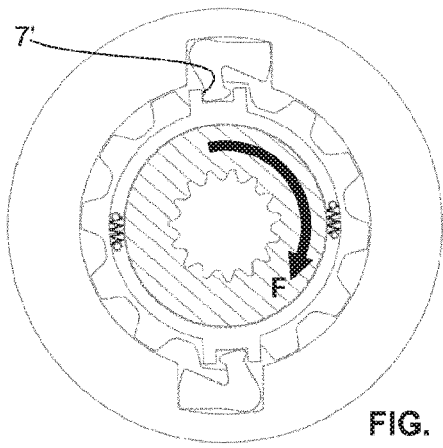
FIG. 1b shows the overrunning clutch from FIG. 1a impinged in the overrun rotation direction.

The embodiment of an overrunning clutch embodied as a freewheeling clutch shown in FIG. 1a, as a torque-introducing clutch member 1, has an internal clutch member by way of which a drive torque is introduced into the overrunning clutch. A switching member in the form of a ratchet 3 is positionally mounted by way of a pivot bearing pin on a torque-receiving clutch member 2 which in the exemplary embodiment shown in FIGS. 1a and 1b is the external clutch member. The position of the ratchet within the clutch and in relation to the clutch members is held in a position required for the clutch to function by way of said positional mounting, wherein the ratchet 3 is pivotable about a pivot axis 4.

An actuator, embodied as a friction ring 5, in which the ratchet 3 loosely engages by way of an actuation lever 6 in that said actuator in the axial direction, between two actuation edges 7',7" which form an actuation detent 7, freely protrudes between the two actuation edges 7',7", is situated on the internal torque-introducing clutch member 1.

The friction ring 5, here in an exemplary manner embodied in two parts, encompasses an outwardly directed radial face of the torque-introducing internal clutch member 1, and by way of pre-tensioning elements which are formed by small tension springs 8', by way of the internal face of said friction ring 5 that faces the radial face of the clutch member 1, is slightly set against the radial face of the clutch member 1 such that the described radial face pairing configures a friction pairing. Thus, the actuator, embodied as the friction ring 5 and the component with which said actuator forms a friction pairing, embodied as the internal torque-introducing clutch member 1, are separate components, wherein a differential rotating speed can be established between the friction ring 5 and the internal torque-introducing clutch member 1, and the friction ring 5 and said internal torque-introducing clutch member 1 are capable of being rotatably moved relative to one another.

The ratchet 3, in the engagement position shown in FIG. 1a, bears in a form-fitting manner on detents 9 which are provided on the external side on the torque-introducing clutch member.

When the internal torque-introducing clutch member 1 is now driven in the load rotation direction M indicated by the plotted arrow in FIG. 1a, the torque by way of a detent 9 and the ratchet 3 is relayed to the torque-receiving clutch member 2. The torque-receiving clutch member 2 is driven and rotates at the same speed as the torque-introducing clutch member 1.

When the torque-introducing internal clutch member 1 changes the rotation direction, or the torque-receiving external clutch member 2 overtakes the internal clutch member 1 in the rotation direction plotted in FIG. 1a, a change in the rotation-angle position between the clutch members takes place. A change of bearing takes place within the actuation detent 7. The actuation lever 6 comes to bear on the actuation edge 7' on the friction ring 5, plotted on the left in FIG. 1b, and by way thereof is imparted an actuating force on account of which an actuating torque acts on the ratchet 3, said actuating torque urging the ratchet 3 from the engagement position to be seen in FIG. 1a to the overrun position to be seen in FIG. 1b. The friction force induced between the friction ring 5 and the radial face on the internal clutch member herein permanently urges the friction ring 5 by way of the left actuation edge 7' against the actuation lever 6 such that the ratchet 3 is permanently held (as long as the corresponding operating state is upheld) in the overrun position shown in FIG. 1b.

In a fresh change in the relative rotation direction between the two clutch members, the procedure is reversed (change from the overrun-permitting state shown in FIG. 1b back to the load-transmitting state shown in FIG. 1a). A change of bearing yet again takes place within the actuation detent 7, and the actuation lever 6, on account of the friction ring 5 as a result of the change in the rotation direction of the internal clutch member being entrained in a friction-force-induced manner by the internal clutch member in the other direction, now comes to bear on the other actuation edge 7" (in the figures the actuation edge on the right of the actuation detent 7 acting in the double sided manner), on account of which the ratchet 3 is again urged from the overrun position shown in FIG. 1b to the engagement position shown in FIG. 1a, and the load-transmitting state to be seen from FIG. 1a is re-established.

Figure 2A:
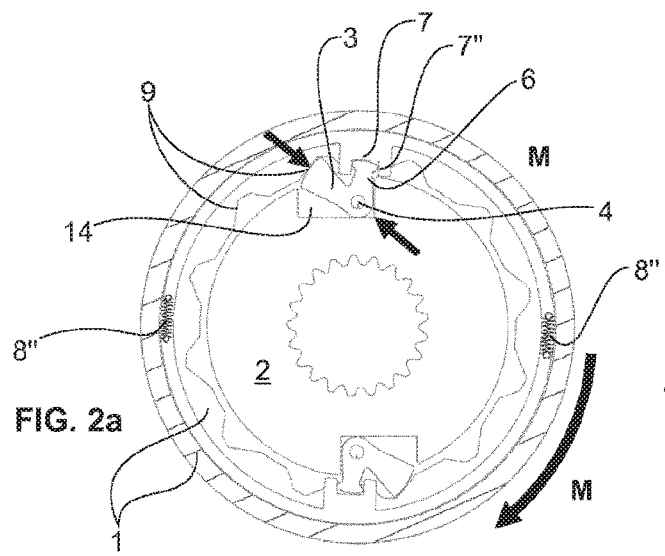
FIG. 2a shows a schematic diagram of an overrunning clutch which is configured as a freewheeling clutch and is impinged in the load rotation direction, the torque-introducing clutch member in said overrunning clutch being the external clutch member and the torque-receiving clutch member being the internal clutch member.

In the overrunning clutch embodied as a freewheeling clutch in the embodiment shown in FIG. 2a, the external clutch member is the torque-introducing clutch member 1, and the internal clutch member is the torque-receiving clutch member 2. The switching member which here is also present in the form of a ratchet 3 is positionally mounted on the torque-receiving internal clutch member and is pivotable about a pivot axis 4.

The actuator embodied as a friction ring 5 is situated within the torque-introducing clutch member 1, and by way of two actuation edges 7',7" configures an actuation detent 7 in which the ratchet 3 loosely engages by way of the actuation lever 6.

The friction ring 5 by way of the outwardly directed radial face thereof on the internal side of the torque-introducing clutch member 1, on account of compression springs 8" that function as pre-tensioning elements, is set against an inwardly facing radial face on the clutch member 1 such that the described radial face pairing configures a friction pairing.

The ratchet 3 in the engagement position shown in FIG. 2a bears in a form-fitting manner on detents 9 which are provided on the internal side on the torque-introducing clutch member 1. When the external clutch member 1 is driven in the load rotation direction M indicated by the plotted arrow in FIG. 2a, the torque by way of a detent 9 and the ratchet 3 is relayed to the torque-receiving internal clutch member 2 on which the ratchet 3 is positionally mounted and supported in torque-transmitting manner. The torque-receiving internal clutch member 2 is driven and rotates at the same speed as the torque-introducing clutch member 1 in the rotation direction indicated by the direction arrows in FIG. 2a.

Figure 2B:
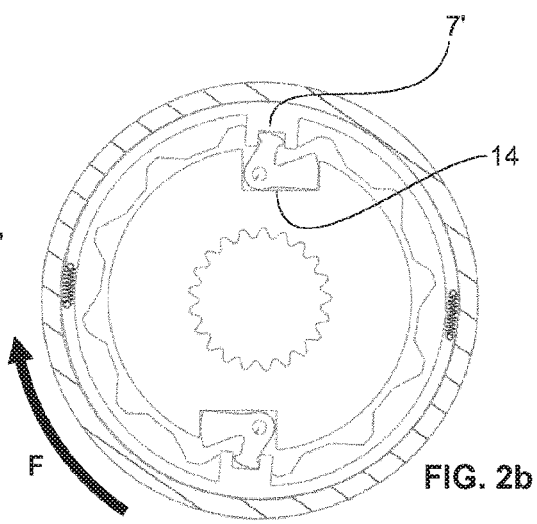
FIG. 2b shows the overrunning clutch from FIG. 3a impinged in the overrun rotation direction.

Should the torque-introducing external clutch member 1 as a result of a change in the rotation direction rotate in the overrun rotation direction shown in FIG. 2b, or should the torque-receiving internal clutch member 2 overtake the external clutch member 1 in the rotation direction plotted in FIG. 2a, a change in the rotation-angle position takes place between the clutch members. A change of bearing takes place within the actuation detent 7. The actuation lever 6 comes to bear on the actuation edge 7' plotted on the right in FIG. 2b and is imparted an actuating force by way of which an actuating torque acts on the ratchet 3, said actuating torque urging the ratchet 3 from the engagement position to be seen in FIG. 2a to the overrun position to be seen in FIG. 2b. The friction force induced between the friction ring 5 and the inwardly facing radial face on the outer clutch member 1 permanently urges the friction ring 5 by way of the right actuation edge 7' against the actuation lever 6 such that the ratchet 3 is permanently urged to the overrun position shown in FIG. 2b and is held in this position as long as the stressed state is upheld.

In a fresh change of the relative rotation direction between the two clutch members, the procedure is reversed (change from the overrun-permitting state shown in FIG. 2b back to the load-transmitting state shown in FIG. 2a). A change of bearing yet again takes place within the actuation detent 7 and the actuation lever 6, on account of the friction ring 5 as a result of the change in the rotation direction of the external clutch member being entrained in the other direction by the external clutch member, comes to bear on the other actuation edge 7" plotted on the left in FIG. 2a, on account of which the ratchet 3 is urged from the overrun position shown in FIG. 2b to the engagement position shown in FIG. 2a and the state to be seen from FIG. 2a is re-established.

In the context of FIGS. 1a to 2 it is to be noted that the overrunning clutches described above as freewheeling clutches would function as a reverse rotation lock when the torque-receiving clutch member 2 is not a conjointly rotating but locationally fixed clutch member which in particular may also be formed by a housing of a drivetrain functional group of a motor vehicle or may be disposed so as to be locationally fixed on such a housing. The rotation of the torque-introducing clutch member 1 would be blocked by way of the locking member 3 when the clutch is being impinged in the load rotation direction M. By contrast, the torque-introducing clutch member 1 could freely rotate in the overrun rotation direction shown in FIG. 1b and FIG. 2b.

Figure 3A:
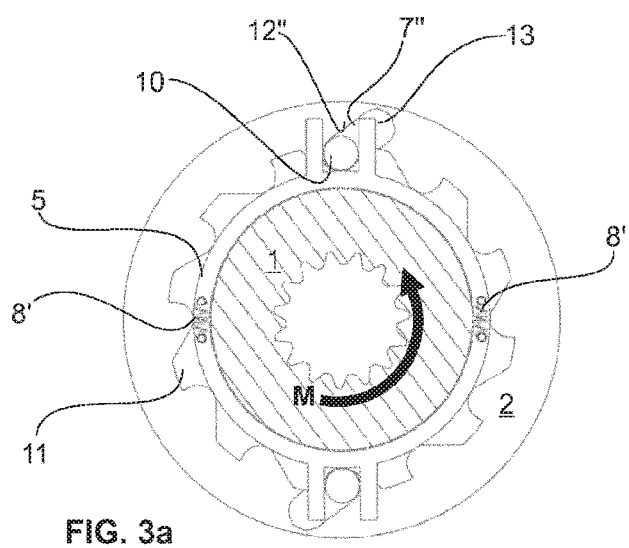
FIG. 3a shows a schematic diagram of an alternative design embodiment of an overrunning clutch which is configured as a freewheeling clutch and is impinged in the load rotation direction, the torque-introducing clutch member in said overrunning clutch being the external clutch member and the torque-receiving clutch member being the internal clutch member.
Figure 3B:
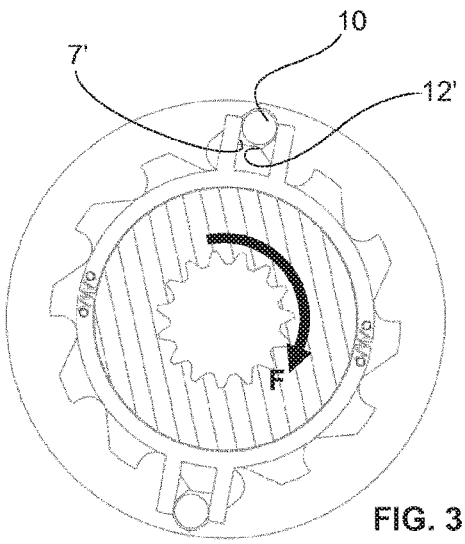
FIG. 3b shows the overrunning clutch from FIG. 3a impinged in the overrun rotation direction.

FIG. 3a shows a schematic diagram of an alternative design embodiment of an overrunning clutch which can be referred to as a roller overrunning clutch and hereunder in an exemplary manner is described as a reverse rotation lock, but of course may also be used as a freewheeling clutch. Here too, the load rotation direction M is shown in FIG. 3a, while the overrun rotation direction F is shown in FIG. 3b. In a manner analogous to the embodiment shown in FIG. 1a and FIG. 1b, the torque-introducing clutch member 1 is the internal clutch member, and the torque-receiving clutch member 2 is the external clutch member.

In the overrunning clutch according to FIG. 3a and FIG. 3b, a switching member embodied in the form of a blocking pin 10 lies so as to be displaceable within a blocking pin receptacle 13 which extends in an oblique radial manner and serves as a guide for the blocking pin 10, said blocking pin receptacle 13 in the schematic exemplary embodiment shown in the figures being provided in the external clutch member 2. Moreover, the blocking pin 10 lies loosely between two radial elevations which from a friction ring 5 that functions as an actuator extend radially outward and form the actuation edges 7',7" of an actuation detent 7.

In a change in the state of a clutch impinged in the overrun rotation direction F to a clutch impinged in the load rotation direction M, the blocking pin 10 is entrained by the friction force exerted by the internal clutch member 1 on the actuator configured as the friction ring 5 and moved in a translatory manner within the blocking pin receptacle 13, wherein the clutch member in frictional contact with the actuator 5, thus the torque-introducing clutch member 1 in the exemplary embodiment. On account thereof, the actuation edge 7" sets the blocking pin 10 against the guide face 12" that in this load direction guides the blocking pin 10 obliquely inward and therefore urges said blocking pin 10 radially inward such that a toothing 11 that is provided externally on the internal clutch member 1 by way of the blocking pin 10 comes to engage with the torque-receiving external clutch member 2. The external torque-receiving clutch member 2 blocks the rotation of the internal torque-introducing clutch member (switched state according to FIG. 3a, engagement position). When transitioning from the overrun position to the engagement position, the clutch member which is in frictional contact with the actuator 5, the torque-introducing member, for example rotates by approximately 10° before the load-transmitting contacts by means of the locking member that guarantee the engagement become effective. This can of course also apply to the embodiment of an overrunning clutch shown in FIGS. 1a to 2a, as well as in FIGS. 4a to 6b.

The locking members per se, at least in the portion in which said locking members when the clutch is being impinged in the load rotation direction come to bear in a load-supporting manner on the first or second clutch member, are configured so as to be rotationally symmetrical. The locking members are for example formed by an overall rotationally-symmetrical body, in particular by a cylinder.

In a change of the rotation direction from the load rotation direction M to the overrun rotation direction F (FIG. 3b), the friction ring 5, driven by the friction pairing existing with the internal clutch member 1 urges the blocking pin 10 by means of the actuation edge 7' against the guide face 12' and radially outward to an overrun position, said guide face 12' in this load direction guiding the blocking pin 10 obliquely outward. The toothing faces of the toothing 11 which in the overrun rotation direction F come to bear on the blocking pin 10 are simultaneously also configured such that said toothing faces support the blocking pin 10 in being outwardly urged to the overrun position. As can be seen, the blocking pin 10 in FIG. 3b no longer impedes a free rotation in the overrun rotation direction F of the internal clutch member in relation to the external clutch member. The actuation edge 7' on account of the friction force induced between the internal clutch member 1 and the friction ring 5 permanently urges the blocking pin to the position shown in FIG. 3b.

It can be seen from FIGS. 3a and 3b that the blocking pin receptacle 13 which functions as a blocking pin guide and serves for guiding the blocking pin 10 from the engagement position to the overrun position (and vice versa), is for example disposed in the clutch member that is not in frictional contact with the actuator. Of course, the overrunning clutch shown in FIGS. 3a and 3b can be used as a freewheeling clutch when the torque-receiving clutch member is not supported in a rotationally fixed manner. In a correspondingly obvious modification, the torque-introducing clutch member can also be the external clutch member, and the torque-receiving clutch member can be the internal clutch member.

The following FIG. 4a to FIG. 8b show an overrunning clutch 20 or sub-groups or parts thereof, which can be used as a reverse rotation lock. The overrunning clutch can be fixedly disposed on a housing on an axle drive unit of a motor vehicle and be used as a self-switching reverse rotation lock, for example. The housing herein functions as a torque-receiving clutch member 22 which, depending on whether an intermediate member 23 is situated in an over-run-permitting or a load-transmitting position, permits the rotation of a torque-introducing clutch member 21 in an overrun direction F or blocks said rotation in a load rotation direction M counter to the overrun direction. The torque-receiving external clutch member 22 in the design embodiment of the overrunning clutch as a freewheeling clutch can also be a rotatably mounted clutch member while simultaneously retaining the functions described hereunder.

The position of the overrunning clutch illustrated in FIG. 4a is a load-transmitting position. An axially displaceable intermediate member 23 is disposed between the external torque-receiving clutch member 22 and an internal torque-introducing clutch member 21. The intermediate member 23 is configured as an externally and internally toothed ring and is received in an annular space between the external clutch member 22 and the internal clutch member 21, said annular space being created in that the external clutch member 22 in the axial direction engages across the internal clutch member 21.

Figure 5A:
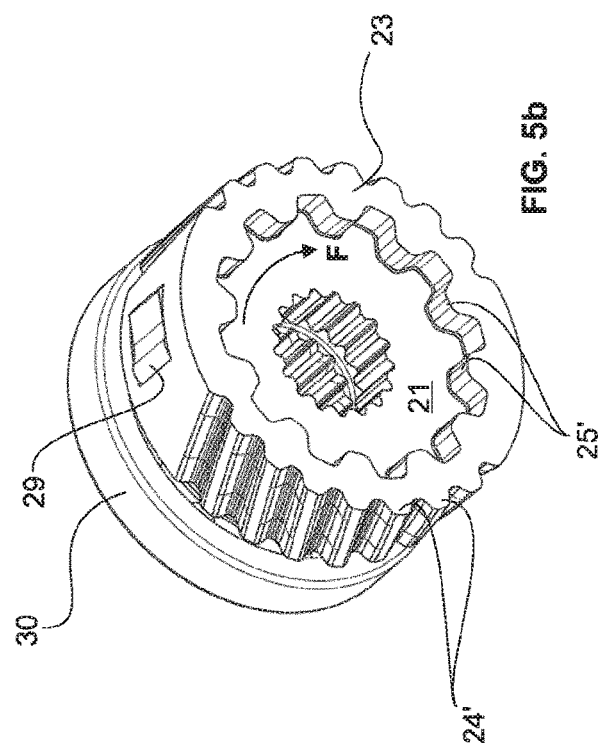
FIG. 5a shows the overrunning clutch according to FIGS. 4a and 4b in the position shown in FIG. 4a, while omitting the clutch housing.
Figure 6A:
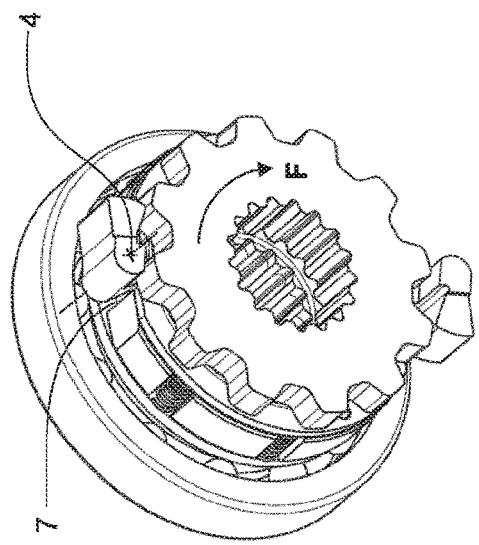
FIG. 6a shows the overrunning clutch according to FIG. 4a and FIG. 4b in the position shown in FIG. 4a and FIG. 5a, while omitting the clutch housing and the intermediate member.

The intermediate member 23 as an external load toothing has a helical toothing 24', and as an internal-side load toothing has an internal toothing 25'. The external-side helical toothing 24' engages with an internal helical toothing 24" which is provided on the internal side of the external clutch member 22 and is thus rotationally fixed. The external helical toothing 24' extends across the entire axial width of the intermediate member 23. The inwardly directed toothing 25' on the intermediate member engages with an external toothing 25" which is disposed on the internal clutch member 21. The internal toothing 25' on the intermediate member 23, or the external toothing 25" on the internal torque-introducing clutch member 21, when viewed in the axial direction extend only across a short axial sub-region of the intermediate member 23, or of the internal clutch member 21, respectively, and mutually engage in a load-transmitting manner also only in the load-transmitting position (FIGS. 4a, 5a, 6a).

The toothing pairings 24',24" and 25',25" form the load toothing pairings by way of which in the intended use of the overrunning clutch torque by way of the intervention of the intermediate member is transmitted between the clutch members 21, 22. Said load toothing pairings in the load transmission position are distributed axially across a toothing width B which can be seen from FIG. 4a. The toothing width B is defined by the maximum axial spacing of external toothing planes which are perpendicular to the rotation axis and in which load toothing pairings effective on the internal side and/or the external side of the intermediate member are still just effective.

Since the load toothing 24' which in the exemplary embodiment shown in the figures is disposed on the intermediate member and engages with the clutch member 22 extends across the entire width of the intermediate member 23, and the load toothing 25' which engages with the clutch member 21 does not extend axially beyond the load toothing 24', the toothing width B in this exemplary embodiment simultaneously corresponds to the axial width of the intermediate member 23.

The intermediate member 23 is disposed so as to be axially displaceable between the internal clutch member 21 and the external clutch member 22 and under the effect of the helical toothing pairing 24',24" can be displaced axially from the load-transmitting position shown in FIG. 4a to the overrun-permitting position shown in FIG. 4b. While the intermediate member 23 and the internal clutch member 21 in FIG. 4a for load transmission engage by way of the toothing pairing 25', "25 and the intermediate member 23 by way of the axial external face thereof that faces to the right is axially supported in relation to the roller bearing 30, the intermediate member 23 in the position shown in FIG. 4b is displaced to the left and is disengaged from the internal clutch member 21.

To this end, a blocking ring 26 functioning as a blocking part has initially been rotated relative to the clutch member 22, from the blocking position shown in FIG. 4a to the release position shown in FIG. 4b. In the blocking position shown in FIG. 4a, a toothing on the blocking ring 26, said toothing corresponding to the helical toothing 24" provided on the internal side on the external clutch member 22, initially blocks, as a blocking toothing 27, an axial displacement of the intermediate member 23 to the left. The blocking ring is rotated to the release position shown in FIG. 4b by rotating the blocking ring 26 relative to the external clutch member by means of a blocking-part actuator mechanism 28 assigned to the blocking ring 26, the blocking toothing 27 in said release position overlapping the helical toothing 24 provided on the internal side on the external clutch member 22 such that the intermediate member 23 can move into the blocking toothing 27. The intermediate member 23 and the internal clutch member 21 thereafter disengage, and the internal clutch member 21, as a result of the disengagement of the intermediate member 23 and the internal clutch member 21, can freely rotate in the overrun rotation direction F indicated in FIG. 4b.

The provision of a blocking part is not required for the function of the clutch as a pure overrunning clutch which permits free rotation in an overrun direction and a load transmission when rotationally stressed counter to the over-run direction. However, said blocking part does offer the possibility of blocking the transition to the overrun-permitting position and to thus enable a load transmission in the overrun rotation direction when the blocking part is situated in the blocking position.

It can be seen in FIGS. 4a to 6b that two switching members which are configured as control latches or control members 29, respectively, and which also function as synchronization members, are disposed on the intermediate member 23 within the toothing width B and radially on the internal side of the overreach by way of which the external clutch member 22 engages in an overlapping manner across the internal clutch member 21 while forming an annular space. The control members 29 are positionally mounted in two diametrically opposite pocket-type cutouts in the intermediate member 23 (visualized in FIG. 5a and FIG. 5b), wherein said control members 29 are received so as to be freely pivotable in the intermediate member 23 and are radially supported on the external side in relation to the adjacent clutch member 22, and in the circumferential direction are supported in relation to the intermediate member 23. An additional mounting element, for instance a pivot bearing pin, that interacts with the control members is not provided. Instead of a positional mounting of this type of the control members in the intermediate member, which guarantees that the control members can support a very high load, it is also possible that the control members 9 are pivotably mounted by means of pivot bearing pins which are supported on the intermediate member laterally of the control latches and engage in the control members.

The number of two switching members and the diametrically opposite disposal thereof which advantageously stresses the intermediate ring symmetrically in the circumferential direction has proven to be an advantageous design embodiment. However, a number of switching members which differs therefrom may also be provided (one or more than two), and another disposal may be chosen. The same of course also applies to the embodiments shown in FIGS. 1a/1b, 2a/2b, and 3a/3b, in which at least two switching members are likewise provided as examples, which for reasons of a uniform distribution of load and for avoiding imbalances are furthermore for example distributed uniformly across the circumference.

Figure 5B:
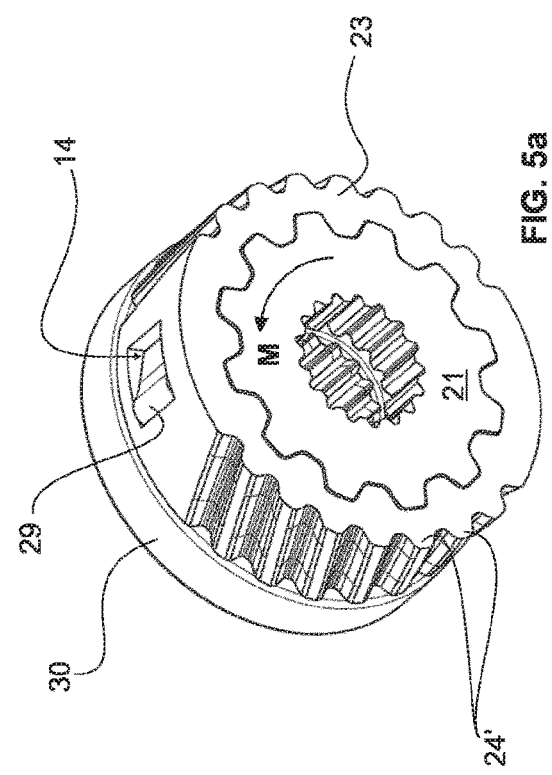
FIG. 5b shows the overrunning clutch FIG. 4a and FIG. 4b in the position shown in FIG. 4b, while omitting the clutch housing.
Figure 6B:
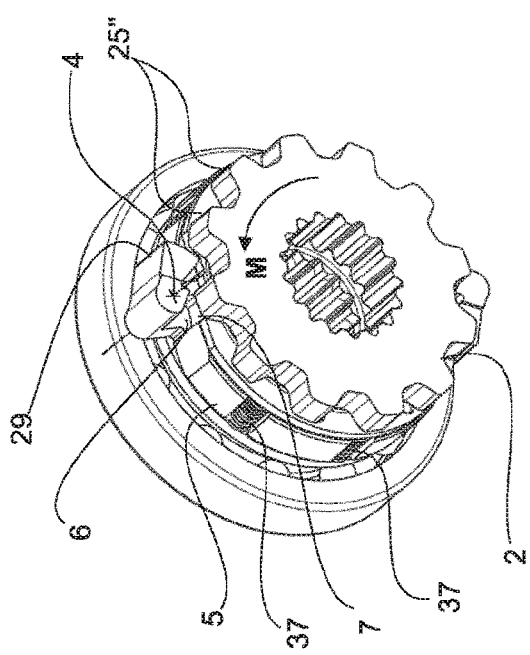
FIG. 6b shows the overrunning clutch according to FIG. 4a and FIG. 4b in the position shown in FIG. 4b and FIG. 5b, while omitting the clutch housing and the intermediate member.

By omitting the intermediate member in the drawing it can be seen from FIG. 6a and FIG. 6b that the control members 29 embodied as control latches engage with an actuator configured as a friction ring 5 by way of an intermediate element which is axially offset in relation to the control members 29 and is configured as an actuation lever 6. The friction ring 5 is in frictional contact with the internal clutch member 21 as well as with the internal ring of the bearing 30, and in a relative rotation of the internal clutch member 21 and the intermediate ring 23, on account of the actuation lever 6 interacting in a form-fitting manner with the intermediate member 23 on the one hand, and with the friction ring 5 on the other hand, is however prevented from rotating conjointly with the internal clutch member 21 and the internal ring of the bearing 30 conjointly rotating with the latter. Rather, the friction ring 5 by way of the actuation edges 7',7", which are configured on said friction ring 5 and are formed by clearances 33 in the friction ring 5, is urged against the actuation levers 6 which on account thereof are imparted a friction-induced actuating force that acts in the circumferential direction of the friction ring 5, on account of which in turn an actuating torque is exerted on the control members 29. Depending on the direction of the change in the rotation-angle position between the internal clutch member 21 and the intermediate member 23, the control members 29 are thus urged either to an overrun position in which the free ends of the control members 29 in the radial direction are pivoted away from the internal clutch member 21 and are situated outside the reach of the external toothing 25" provided on the internal clutch member 21 (FIGS. 5b and 6b). Or the control members 9 in a change from the overrun rotation direction F shown in FIGS. 5b and 6b to the load rotation direction M are urged to an engagement position in which the free ends of the control members 29 are pivoted radially inward in the direction of the internal clutch member 21, and on account thereof come to bear on the external toothing 25". In a rotation of the internal clutch member 21 relative to the intermediate ring 23 in the overrun rotation direction F (FIG. 5b, FIG. 6b), the control members 29 are thus permanently urged outward to the overrun position, disengaged from the toothing 25" provided on the internal clutch member 21.

The actuation detent 7 which is configured on the friction ring 5, by way of the actuation edges 7',7" thereof that act in the circumferential direction, and which in the exemplary embodiment shown is formed by a depression extending in the axial direction in the friction ring 5, has an effective width which permits an axial displacement of the actuation levers 6 which loosely engage in the actuation detent 7 and which in the axial direction are moved conjointly with the intermediate member 23 and the control members 29. This axial displacement capability of the intermediate elements (actuation levers 6) acting between the actuator (friction ring 5) and the switching member (control latches 29) within the actuation detent 7 can be visually derived in particular when comparing FIGS. 6a and 6b.

Figure 7B:
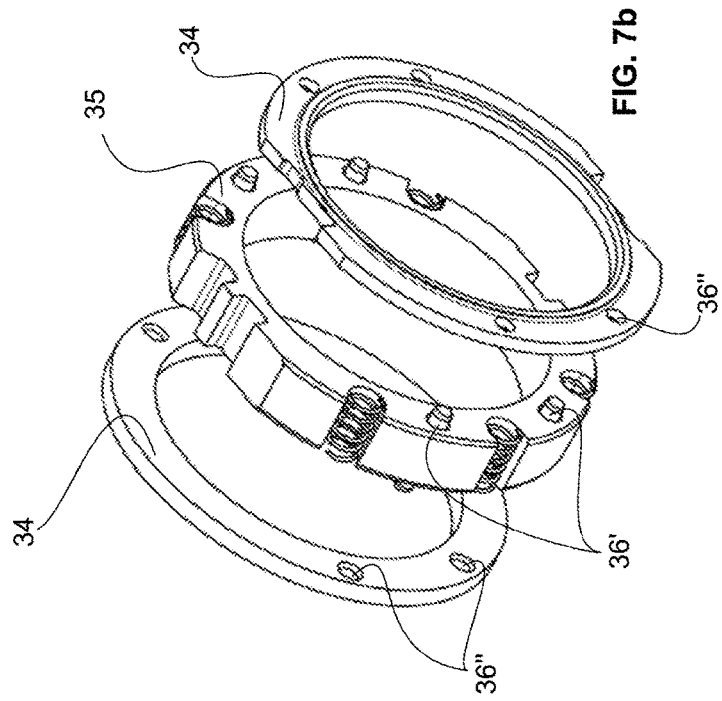
FIG. 7b shows the control member from FIG. 7a in an exploded illustration.
Figure 7A:
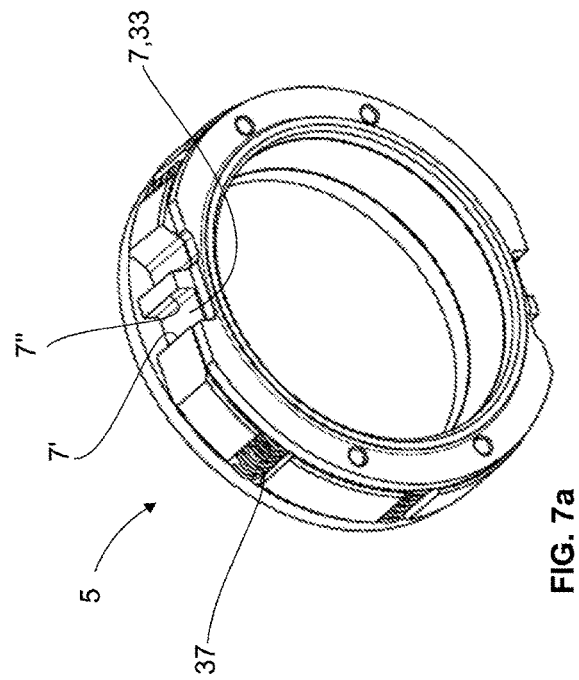

The actuator configured as the friction ring 5 for the purpose of visualization is shown in detail in FIG. 7a and FIG. 7b.

The friction ring 5 has a number of actuation detents 7 which corresponds to the number of control latches or actuation levers and which are positioned so as to correspond to a positioning thereof on the intermediate member, said actuation detents 7 being able to engage in the switching members or with intermediate elements (actuation levers) that interact with the switching members. The actuation detents configure actuation edges 7',7" which come to bear on the switching members or intermediate elements so as to be able to transmit in a form-fitting manner to the switching member the actuating forces exerted by the friction ring 5. Of course, other types of actuation edges, protrusions, or other means which enable the actuator to come to bear in a form-fitting manner on the switching members or intermediate elements may also be provided.

Friction members 34 which act in the axial direction and extend across at least a sub-portion of the circumference, for example across the entire circumference, of the friction ring 5 and are assigned to a support ring 35, are provided on the friction ring 5 which is configured in multiple parts. The friction members 34 and the support ring 35 herein by way of mutually corresponding retaining means 36' and 36" mutually engage in such a manner that the friction members are held so as to be axially displaceable at least to a minor extent in relation to the support ring 35 but are nevertheless secured against rotation in relation to the support ring 35. Receptacles for pre-tensioning elements 37, for example in the form of the helical springs shown in the figures, are provided in the support ring 35, the friction members 34 being urged away from the support ring 35 in the axial direction by said pre-tensioning elements 37.

When the friction ring 5 during insertion is compressed in the axial direction by an annular gap which is laterally delimited by two delimitation faces, the pre-tensioning elements 37 exert an actuating force on account of which the friction members 34 by way of the lateral external faces thereof are set against the delimitation faces which laterally delimit the annular gap. Axial friction face pairings are thus formed on both sides of the friction ring 5, the friction force of said axial friction face pairings being able to be influenced in a targeted manner by way of the pre-tensioning elements.

Figure 8B:
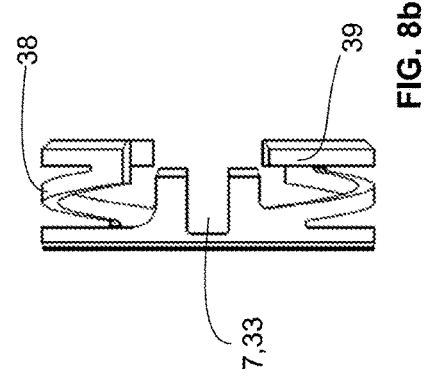
FIG. 8b shows the friction ring shown in FIG. 8a in a lateral view.
Figure 8A:
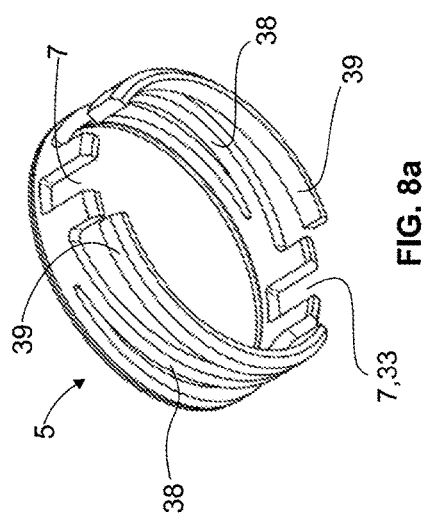
FIG. 8a shows an alternative design embodiment of a control member configured as a friction ring in a perspective view.

FIG. 8a and FIG. 8b show an alternative design embodiment of a friction ring 5. Flexing webs 38 which form the pre-tensioning elements and are effective as flexible springs and exert a pre-tensioning force, which influences the friction and acts in the axial direction on the lateral arms 39, and which in the circumferential direction extend across a sub-portion of the circumference of the friction ring are provided on the friction ring 5, said flexing webs acting in the axial direction and extending across at least a sub-portion of the circumference. When the friction ring 5 during insertion is compressed in the axial direction by an annular gap which is laterally delimited by two delimitation faces, the flexing webs as pre-tensioning elements exert a pre-tensioning force on account of which the friction ring 5, by way of the axial external faces thereof that are formed laterally of the lateral arms 39, while forming an axial friction face pairing is set against the delimitation faces which laterally delimit the annular gap. This design embodiment also has an actuation detent 7 in which the actuation edges 7',7" are formed by the lateral edges of clearances 33 that are provided in the friction ring 5.

In the two exemplary design embodiments of a friction ring described above it is guaranteed that the friction ring is received without play in the annular gap. Moreover, the friction torque which is imparted to the friction ring when the latter is held in a stationary manner in the annular gap as the latter rotates, can be readily set by way of the design embodiment or the dimensioning, respectively, of the pre-tensioning elements. In the exemplary embodiments shown in FIGS. 4a to 6b the annular gap is formed between the internal ring of the bearing 30 and the lateral faces of the load toothing 25 provided on the clutch member 21 that face said internal ring.

All preceding embodiments of FIGS. 1a to 6b have in common the design embodiment, in which the switching members, irrespective of being configured as a locking member or a ratchet, respectively, or as a control member or a control latch, respectively, or as a blocking pin, are received and guided so as to be pivotable or displaceable in a translatory manner in that clutch member that is not in frictional contact with the actuator.

All the embodiments of FIGS. 1a to 2b, as well as 4a to 6b, can furthermore be designed in such a manner that the switching members are freely received in a switching member receptacle 14 of a clutch member, for example of the load-receiving clutch member, or of the intermediate member, in such a manner that the switching members under load are supported in relation to the adjacent component or components (in relation to the clutch member per se and/or in relation to the intermediate member) only by way of external bearing faces. The (imaginary) pivot axis 4 in this instance is defined by the bearing points which the respective switching member forms conjointly with the adjacent components. The switching member receptacle is for example formed by a pocket-type depression in a clutch member, in particular the torque-receiving clutch member, or a pocket-type depression or a cutout in the intermediate member.

It is to be pointed out that the arrangements or the allocations, respectively, of the individual functional elements of the overrunning clutch, in particular the arrangement or allocation, respectively, of the helical toothing, the control latch, the actuator, the actuation edges of the actuation detent, and the blocking part by way of the blocking elements thereof on the one or other clutch member or the intermediate member, as well as the question whether the torque-introducing or the torque-receiving clutch member in the overlap region is disposed so as to be internal or external to the respective other clutch member, and which of the toothing types are provided so as to be radially on the external side or radially on the internal side on the functional parts, are not mandatorily predefined for maintaining the basic function of the described overrunning clutch and for the constructive design embodiment described as advantageous in the context of the disclosure, and do not necessarily have to be provided as is shown in an exemplary manner in the figures. The subject matter of the disclosure is not departed from by modifying the arrangement or allocation, respectively, of the individual functional elements in relation to the design embodiment shown in the figures.

It is to be pointed out once again that the overrunning clutch as shown in the figures may be conceived as a reverse rotation lock. The overrunning clutch may however also be conceived as a freewheeling clutch in which one clutch part drives the other in a rotating manner in a load-transmission direction M and is able to overrun the other clutch part in an overrun direction F.

LIST OF REFERENCE SIGNS

1 Torque-introducing clutch member
2 Torque-receiving clutch member
3 Switching member (ratchet)
4 Pivot axis
5 Actuator (friction ring)
6 Intermediate element (actuating lever)
7 Actuation detent
7',7" Actuation edge
8',8" Pre-tensioning element (tension spring/compression spring)
9 Detents of a detent collar
10 Actuator (blocking pin)
11 Toothing
12',12" Guide faces
13 Blocking pin receptacle
14 Switching member receptacle
21 Torque-introducing clutch member
22 Torque-receiving clutch member
23 Intermediate member
24' External helical toothing on the intermediate member
24" Internal helical toothing on the first clutch member
25' Internal helical toothing on the intermediate member
25' Internal toothing on the intermediate member
25" External toothing on the second clutch member
26 Blocking part (blocking ring)
27 Blocking-part toothing
28 Blocking-part actuator mechanism
29 Switching member (control member)
30 Roller bearing
33 Clearance
34 Friction members
35 Support ring
36', 36" Retaining means
37 Pre-tensioning elements (compression springs)
38 Pre-tensioning elements (flexing web)
39 Lateral arms
M Load rotation direction
F Overrun rotation direction

The invention claimed is:

1. An assembly comprising:
    an overrunning clutch including a torque-introducing clutch member, a torque-receiving clutch member, and a switching member;
    wherein, as a function of the direction of an adequate change in the rotation-angle position prevalent between the torque-introducing clutch member and the torque-receiving clutch member, by an actuating force exerted on the switching member by an actuator, the switching member is urged (1) from an engagement position to an overrun position to indirectly or directly establish free mutual rotation of the clutch members in an overrun rotation direction, or (2) from the overrun position to the engagement position to indirectly or directly establish a rotationally fixed coupling of the clutch members;
    wherein the actuating force is a friction-force-induced actuating force which is induced by a friction-force pairing between the actuator and a component of the overrunning clutch that is in frictional contact with the actuator, and the actuator configures an actuation detent which acts in a form-fitting manner indirectly or directly on said switching member and by way of which the actuating force acts indirectly or directly on the switching member;

wherein the actuator is separate from the component with which the actuator forms a friction pairing;

wherein a differential rotating speed can be established between the actuator and the component with which the actuator forms a friction pairing; and wherein the actuator and the component are capable of being rotatably moved relative to one another; and wherein the component of the overrunning clutch that is in frictional contact with the actuator is at least one of the torque-introducing clutch member, the torque-receiving clutch member, or a component that is rotationally fixed to said clutch member.

2. The assembly of claim 1, wherein the switching member is positionally mounted on a component of the overrunning clutch that is separate from the actuator or that is separate from the component of the overrunning clutch that is in frictional contact with the actuator.

3. The assembly of claim 1, wherein the switching member loosely engages with the actuator by way of the actuation detent.

4. The assembly of claim 1, wherein the switching member is configured as a control member and establishes the free mutual rotation of the clutch members or is configured as a rotationally fixed coupling between the clutch members indirectly in that the switching member initiates the transfer of an intermediate member from a load-transmitting position to an overrun-permitting position or from the overrun-permitting position to the load-transmitting position.

5. The assembly of claim 1, wherein the switching member is a load-supporting locking member and establishes the free mutual rotation of the clutch members or is a rotationally fixed coupling between the clutch members directly in that the switching member alternates between the engagement position and the overrun position.

6. The assembly of claim 1, wherein the actuator, conjointly with the torque-introducing clutch member or a component that is rotationally fixed to the torque-introducing clutch member, forms a friction pairing, and the switching member is positionally mounted on one of (1) the torque-receiving clutch member, (2) a component that is rotationally fixed to the torque-receiving clutch member, or (3) an intermediate member that engages with the torque-receiving clutch member.

7. The assembly of claim 1, wherein when the overrunning clutch is operating in the overrun rotation direction, the actuator and the switching member rotate or stop conjointly with the torque-receiving clutch member while the torque-introducing clutch member rotates in relation to the actuator.

8. The assembly of claim 1, wherein one or a plurality of pre-tensioning elements are provided on the actuator.

9. The assembly of claim 1, wherein the actuator is in frictional contact exclusively with one of the torque-introducing clutch member or the torque-receiving clutch member, or a component that is rotationally fixed to said clutch member, but not also with the respective other clutch member or a component that is rotationally fixed thereto.

10. The assembly of claim 1, wherein the actuator is disposed radially within or radially outside a pivot axis of the switching member.

11. The assembly of claim 1, wherein the actuator is a friction ring and encompasses externally an outwardly facing radial face of an internal clutch member or is tightly fitted in an external clutch member on the internal side of a radially inward facing radial face of the external clutch member, wherein the torque-introducing clutch member is the internal clutch member and the torque-receiving clutch member is an external clutch member, or the torque-introducing clutch member is the external clutch member and the torque-receiving clutch member is the internal clutch member.

12. The assembly of claim 1, wherein the generation of friction force between the actuator and the component with which the actuator forms a friction pairing takes place by way of pairings of mutually neighboring axial faces or by way of pairings of mutually neighboring radial faces.

13. The assembly of claim 1, wherein the actuator is at least in part disposed radially on the inside within an engagement width which is provided on an external clutch member and is torque-transmitting when the clutch is being stressed in a load rotation direction.

14. The assembly of claim 1, wherein, for configuring the actuation detent on the actuator, two actuation edges are configured on the actuator, the two actuation edges act in opposite directions and, for introducing the actuating force onto the switching member, the two actuation edges come to bear in a form-fitting manner on the switching member or an intermediate element that interacts with the switching member.

15. The assembly of claim 1, wherein, for forming the actuation edges, at least one elevation or at least one clearance is provided on the actuator.

16. The assembly of claim 1, wherein the clutch members perform a mutual relative rotation of less than 15° when the overrunning clutch is transitioning from the overrun position to the engagement position.

17. The assembly of claim 1, wherein the switching member is translationally moved or pivoted relative to the torque-introducing clutch member or the torque-receiving clutch member when the overrunning clutch is transitioning from the overrun position to the engagement position or from the engagement position to the overrun position.

18. The assembly of claim 17, wherein the clutch member that is translationally moved or pivoted relative to the switching member is the clutch member that is not in frictional contact with the actuator.

19. The assembly of claim 1, wherein the actuator translationally moves or pivots the switching member within a switching member receptacle which is provided as a pocket-type depression in the clutch member which is not in frictional contact with the actuator, or which is provided as a pocket-type depression or a cutout in an intermediate member.

* * * * *